United States Patent [19]

Kimura et al.

[11] Patent Number: 4,725,459

[45] Date of Patent: Feb. 16, 1988

[54] PROTECTION METHOD FOR MOLDED-PLASTIC SURFACES

[75] Inventors: Hiroski Kimura; Takashi Urabe; Keiji Kobayashi; Nobuhiro Saito, all of Ohta, Japan

[73] Assignee: Toshiba Silicone Co., Ltd., Japan

[21] Appl. No.: 939,919

[22] Filed: Dec. 10, 1986

[30] Foreign Application Priority Data

Dec. 25, 1985 [JP] Japan ................................ 60-290689

[51] Int. Cl.$^4$ ............................................... B05B 1/36
[52] U.S. Cl. ................................ 427/412.5; 427/412.1
[58] Field of Search ................... 427/412.5, 407.1, 387, 427/412.1; 525/939

[56] References Cited

U.S. PATENT DOCUMENTS

| | | | |
|---|---|---|---|
| 4,310,600 | 1/1982 | Cross | 427/412.5 |
| 4,313,979 | 2/1982 | Frye et al. | 427/412.5 |
| 4,324,712 | 4/1982 | Vaughn, Jr. | 428/447 |
| 4,456,647 | 6/1984 | Schonfelder et al. | 427/387 |
| 4,495,020 | 1/1985 | Nakabayashi et al. | 427/412.5 |
| 4,624,870 | 11/1986 | Anthony | 427/387 |

Primary Examiner—Thurman K. Page
Assistant Examiner—L. R. Horne

[57] ABSTRACT

A protection method for molded-plastic surfaces comprising the steps of:

forming on the molded-plastics surface a first film from a composition including (A) acrylic polyol, 5 to 80 parts by weight, (B) polyalkyl methacrylate, 95 to 20 parts by weight and (C) isocyanate compound as an isocyanate group 0.5 to 20 equivalents with respect to 1 equivalent of a hydroxyl group in (A); and forming on the first film a second film from a composition including (D) organosilanetriol, represented by $R^1Si(OH)_3$ wherein $R^1$ represents a monovalent group selected from the group consisting of an alkyl group having 1 to 3 carbon atoms and an aryl group, and/or a partial condensate thereof, 10 to 90 parts by weight and (E) colloidal silica, 90 to 10 parts by weight.

3 Claims, No Drawings

PROTECTION METHOD FOR MOLDED-PLASTIC SURFACES

The present application claims the priority of Japanese patent application Ser. No. 60-290689, filed on Dec. 25, 1985.

BACKGROUND OF THE INVENTION

The present invention relates to a protection method for molded-plastic surfaces and, more particularly, to a surfaces protection method which is capable of providing a surface with high wear resistance and good weathering properties. A protecting film formed on molded-plastic surfaces by the protection method of the present invention has a high thermal shock resistance.

Plastic panels, which are light and not easily broken, have recently come into wide use in place of glass panels. For instance, transparent plastic panels produced from a synthetic organic polymer are now generally used in transportation vehicles such as trains and buses, optical instruments and building materials.

In spite of the above-described merits, transparent plastics have some disadvantages. For instance, plastic surfaces are susceptible to damages such as scratches, which reduce the transparency and damage the external appearance. Furthermore, when transparent plastics are exposed to ultraviolet light as in sunlight for a long period of time, they are likely to discolored.

Various attempts have been made to improve the wear resistance of transparent plastics. For example, it is known that it is possible to provide wear resistance to molded-plastic surfaces of, for example, acrylic resins and polycarbonate resins by coating them with a film forming material which is composed of a mixture of colloidal silica and hydrolyzable silane (see, e.g., Japanese Patent Publication Kokai Nos. 55-94971 and 59-68377). With respect to a molded-plastic surface of polyethylene terephthalate, however, if the above-described film forming material is used without any primer, the bonding strength is poor. Not all primers are suitable in all situations, for example, in the case of polythylene terephthalate. The bonding strength is not improved with the above-described film forming material by applying polyalkylmethacryrate as a primer. In contrast however, a primer consisting of an acrylic polyol and its hardening agent isocyanate compound may be used. Even where the correct primer is used, if the curing of the primer is insufficient, the solvent in a top coat material will penetrate the primer layer, which becomes opaque and lowers the commercial value of the molded-plastic article. On the other hand, if the curing is sufficient, there is no problem of opaquing the primer layer and the bonding strength between the primer layer and the coated film is improved, but then cracking and crazing are likely to be produced on the top coated film.

SUMMARY OF THE INVENTION

Accordingly, it is an object of the present invention to solve the above-described problems and to provide a protection method for molded-plastic surfaces. This protection method is capable of providing high wear resistance and good weathering properties for plastics, in particular, polyethylene terephthalate or the like, by forming a protecting film on the surface thereof which is difficult to bond. It is another object of the present invention to make such a protecting film excellent in thermal shock resistance.

As a result of various researches in how to achieve this aim, the present inventors have found that it is advantageous to form a primer layer comprising of (A) an acrylic polyol, (C) a hardening agent, isocyanate compound and (B) polyalkyl methacrylate; prior to forming a protective film comprising later-described (D) and (E) on a molded-plastic surface. The present invention has been achieved on the basis of this finding.

DETAILED DESCRIPTION OF THE INVENTION

The present invention provides a protection method for molded-plastic surfaces comprising the steps of: forming on the molded-plastic surface a first film from a composition (hereinunder referred to as "the first composition") including (A) acrylic polyol, 5 to 80 parts by weight, (B) polyalkyl methacrylate, 95 to 20 parts by weight, and (C) isocyanate compound, as an isocyanate group 0.5 to 20 equivalents with respect to 1 equivalent of a hydroxyl group in (A); and forming on the first film a second film from a composition (hereinunder referred to as "the second composition") including (D) organosilanetriol, represented by $R^1Si(OH)_3$ wherein $R^1$ represents a monovalent group selected from the group consisting of an alkyl group including 1 to 3 carbon atoms and an aryl group and/or a partial condensate thereof 10 to 90 parts by weight, and (E) colloidal silica, 90 to 10 parts by weight.

In the present invention, a protective film from the first and second compositions is formed on the molded-plastic surface. The molded-plastic substrate is not specified so long as it is a synthetic resin product which is generally used. The present invention is characterized in that it enables a protective film to be adhered to a base material of polyethylene terephthalate, which is generally considered to be difficult to bond with a protective film.

Acrylic polyol (A) in the first composition used for the present invention is obtained by copolymerization of at least one acrylic monomer containing a hydroxyl group, or copolymerization of at least one acrylic monomer containing a hydroxyl group and alkyl acrylate and/or alkyl methacrylate. The acrylic monomer containing a hydroxyl group used here is exemplified by hydroxyethyl acrylate, hydroxypropyl acrylate, 2-hydroxybutyl acrylate, and 1,4-dihydroxybutyl monoacrylate. As the copolymerizable alkyl acrylate or alkyl methacrylate, an acrylic ester such as methyl acrylate, ethyl acrylate, butyl acrylate, or a coresponding methacrylic ester may be cited. Suitable acrylic polyols are commercially available as Acrydic A 80145 and Acrydic A 801 (trade name: produced by Dai-Nippon Ink & Chemicals, Inc.)

Polyalkyl methacrylate (B) in the present invention is obtained by polymerizing at least one alkyl methacrylate by a known polymerizing method. High molecular weight polyalkyl methacrylate is prefered. Ordinarily, molecular weight is more than 50,000 and the upper limit is not specified so long as the polyalkyl methacrylate is soluble in a solvent. Examples of the alkyl methacrylates which can be used here are methyl methacrylate, ethyl methacrylate and n-butyl methacrylate. Such a polyalkyl methacrylate is commercially available as ELVACITE 2041 (trade name: produced by E. I. Du Pont de Nemours and Co.) and Dianal BR 85 (trade name: produced by Mitsubishi Rayon Co., Ltd.).

The mixing ratio of (A) and (B) is, 5 to 80 percent by weight of (A) and 95 to 20 percent by weight of (B). If the mixing ratio of (A) is less than 5 percent by weight, the bonding strength of the first film to a molded-plastic surface is reduced. If the mixing ratio of (B) is less than 20 percent by weight, then the curing at the time of forming the first film is insufficient and the first film is opaqued by the solvent during application of the second film. When the curing of the first film is sufficient, a cracking or a crazing is likely to be produced on the second film at the time of forming the second film.

Isocyanate compound (C) is not specified so long as it contains at least two isocyanate groups in a molecule. For example, 2,4-tolylene diisocyanate, methylene diisocyanate, methaxylylene diisocyanate, or an adduct thereof are usable. Such isocyanate compounds are commercially available as Barnoc D750, Barnoc D950 (trade name: produced by Dai-Nippon Ink & Chemicals, Inc.).

(C) is mixed with (A) so that the isocyanate group of the isocyanate compound is 0.5 to 20, preferably 1 to 10 equivalents with respect to 1 equivalent of hydroxyl group in the acrylic polyol. If the isocyanate group is less than 0.5 equivalent, the bonding strength of the first film with respect to the molded-plastic surface is poor, while if it exceeds 20 equivalents, the same disadvantage as in the case of excess (A) is caused at the time of forming the second film.

In order to facilitate the application of the first composition, after dissolving (A) and (B) into an appropriate solvent, (C) and, if necessary, an appropriate catalyst are added, stirred and dissolved. As the appropriate solvent, an organic carboxylic acid ester such as ethyl acetate and butyl acetate; aromatic hydrocarbon such as toluene and xylene; hydrocarbon halides; and ketones such as acetone and methylethyl ketone are cited. The solvent may be one selected from the above-described or a mixture thereof.

The catalyst used is exemplified by amines such as trimethyl amine, triethylene diamine, hexamethylene tetramine, N,N'-dimethyl dodecilamine; organic tin compounds such as dibutyl tin dilaurate and tri-n-butyl tin chloride; and metal salts of an organic acid such as lead naphthenate. An appropriate amount of appropriate catalyst is determined in each instance in order to obtain a preferred reaction speed.

The concentration of the first components (A), (B) and (C) dissolved in solvent is preferably 1 to 20 wt%. If the concentration leaves this range, it is impossible to obtain a suitable film thickness as a primer.

The first film is formed by applying the solution of the first components to the molded-plastic surface by an immersion method, spray method, bar coating method, brush coating method or the like at least one time, then heating and drying it. The heating condition is selected in accordance with the degree of the heat resistance of the plastic to be used, Ordinarily, the heating temperature is 60° to 180° C. and the heating time is 60 to 1 minute. The thickness of the first film is 0.5 to 10 micro meter, preferably 1 to 5 micro meter.

In an organosilanetriol represented by the formula $R^1Si(OH)_3$, and/or a partial condensate thereof in component (D), $R^1$ represents a monovalent hydrocarbon group selected from the group including an alkyl group having 1 to 3 carbon atoms and an aryl group. As examples of the alkyl groups having 1 to 3 carbon atoms are cited a methyl group, an ethyl group and a propyl group, and as examples of the aryl groups a phenyl group is cited.

An organosilanetriol and/or partial condensate thereof is obtained by hydrolyzing, in the presence of a catalyst, an organotrialkoxysilane represented by the formula $R^1Si(OR^3)_3$ wherein $R^1$ is as defined in the above and $R^3$ represents an alkyl group having 1 to 4 carbon atoms. The usable hydrolytic catalysts are exemplified by organic acids such as anhydrous acetic acid, glacial acetic acid, propionic acid, citric acid, benzoic acid, formic acid and oxalic acid; and aluminum chelate compounds such as aluminum acetyl acetonate and aluminum di-n-butoxy monoethyl acetoacetate. Among these, anhydrous acetic acid and glacial acetic acid are preferable.

Colloidal silica (E) is ordinarily used in the form of an aqueous dispersion. Since a colloidal silica is generally unstable in this state, sodium hydroxide is added thereto to stabilize it. The amount of sodium hydroxide to be added is preferably at most 0.35 parts by weight with respect to 100 parts by weight solids of the colloidal silica so as to facilitate the preparation of the composition and maintain the stability. An aqueous dispersion of a colloidal silica is commercially available as, for example, Snowtex (trade name: produced by Nissan Chemicals Industries, Ltd.), and Ludox (trade name: produced by E. I. Du Pont de Nemours and Co.). The colloidal silica may be either acidic or basic.

The mixing ratio of (D) and (E) is, 10 to 90 percent by weight of (D) and 90 to 10 percent by weight of (E). If the mixing ratio leaves this range, a cracking is produced on the formed second film, which makes the formation of a continuous film difficult, and makes it impossible to provide an appropriate hardness for the film.

The second composition may be prepared by mixing an alcohol solution of the component (D) which is obtained in advance by hydrolysis of an organotrialkoxysilane with the component (E); or by dispersing the aqueous dispersion of the content (E) in an alcoholic solvent, adding an organotrialkoxysilane and a catalyst thereto and hydrolyzing the organotrialkoxysilane in the mixture. As the alcoholic solvent, methanol, ethanol, propyl alcohol, butanol, butyl cellosolve, diacetone alcohol, etc. are usable.

When so much water remains in the second composition as to have an unfavorable effect on the bonding strength in the coating step, additional alcohol may be added to the second composition to remove water by azeotropic distillation with the alcohol.

It is possible to add, if necessary, an ultraviolet light absorber, levelling agent, thickening agent, pigment, dye, antioxidant, modifier and the like to the second composition. It is also possible to add an appropriate catalyst so as to accelerate the curing at the time of forming the second film. As examples of the catalysts the following will be mentioned: alkali metal salts of carboxylic acid such as sodium acetate and potassium formate; amine carboxylate such as dimethylamine acetate and ethanolamine acetate; carboxylic acid quarternary ammonium salts such as tetramethylammonium acetate; metal salts of carboxylic acid such as tin octoate; amines such as triethanol amine and pyridine; alkali hydroxides such as sodium hydroxide and ammonium hydroxide; amino silane coupling agents such as 3- aminopropyl triethoxy silane and N-(2-aminoethyl)-3-aminopropyl trimethoxy silane; and aluminum chelate compounds.

The second composition is ordinarily dispersed in the above-described alcoholic solvent and applied. The solids concentration in the dispersion is 5 to 40 wt%. The second film is formed by applying such a dispersion on the first film in the same way as the solution of the first composition is applied to the molded-plastic surface, i.e., at least one time, then heating and drying it. The heating temperature is 60° to 180° C. and the heating time is 3 to 1 hour. The thickness of the second film is 2 to 15 micro meter, preferably 5 to 10 micro meter.

A protective film comprising the first and second films formed on a molded-plastic surface by a method according to the present invention has an excellent bonding strength with respect to the surface, and provides excellent wear resistance and good weathering properties. Furthermore, such a protective film has excellent thermal shock resistance and good boiling water resistance. Thus, a method according to the present invention has great industrial value.

EXAMPLES OF THE INVENTION

The present invention will be described in more detail with reference to the following examples and reference examples. It is to be understood that the examples are for purpose of illustration and are not intended to define the limits of the invention. "Part" in the examples and reference examples represents "part by weight" and "%" represents "% by weight". The mixture ratio in Table 1 is represented by "part by weight".

EXAMPLES 1 TO 8 AND COMPARATIVE EXAMPLES 1 TO 4

Components (A), (B) and (D) used in the present invention were prepared in the following way.
Preparation of a First Composition
  Preparation of component (A):
  44 parts of Acrydic A-810-45 (trade name: produced by Dai-Nippon Ink & Chemicals, Inc.; nonvolatile content: 45%, OH value: 15) was dissolved in 156 parts of toluene to obtain a component (A).
  Preparation of component (B):
  10 parts of Dianal BR 85 (trade name: produced by Mitsubishi Rayon Co. Ltd.; polymethyl methacrylate, molecular weight: 250,000) was dissolved in a mixed solvent of 36 parts of butyl acetate and 54 parts of xylene to obtain a component (B).
  Component (C):
  Barnoc D750 (trade name: produced by Dai-Nippon Ink & Chemicals, Inc.; isocianate content: 13%) Components (A), (B) and (C) were mixed in the composition shown in Table 1, thereby obtaining a first composition.
Preparation of a Second Composition
  220 parts of Ludox (trade name: produced by E. I. Du Pont de Nemours and Co.; aqueous dispersion of colloidal silica having a solids concentration of 30%, pH of 8.2 and an average particle diameter of 12 micro meter) was added to a solution consisting of 1 part of anhydrous acetic acid and 270 parts of methyl trimethoxy silane, and the mixture was reacted at 25° to 30° C. for 24 hours with stirring to obtain a reaction dispersion containing 41% solids. Isobutanol was added to the dispersion and adjusted so that the solids content was 20%, and thereafter 0.8 part of 2,4-dihydroxybenzophenone was added thereto as an ultraviolet light absorber. After the mixture was stirred to make it uniform, it was filtered. 0.05 part of tetramethylammonium formate was further added thereto and stirred to make the mixture uniform, thereby obtaining a second component (1).

400 parts of Snowtex (trade name: produced by Nissan Chemicals Industries, Ltd.; aqueous dispersion of colloidal silica having a solids concentration of 20%, pH of 8.5 and an average particle diameter of 15 micro meter) was added to a solution consisting of 1.5 parts of anhydrous acetic acid and 300 parts of methyltriethoxysilane, and the mixture was reacted at 25° to 30° C. for 16 hours with stirring to obtain a reaction dispersion containing 27.5% of a film forming constituent. 500 parts of isobutanol was added as an azeotropic alcohol, and the surplus water was distilled off in the water-alcohol azeotropic system at a temperature of 20° to 50° C. under a reduced pressure of 20 to 150 mmHg to obtain the reaction dispersion containing 50% of solids. A mixed solvent consisting of 25% isopropyl alcohol, 50% isobutyl alcohol and 25% ethylene glycol monoethyl ether acetate was added to the dispersion and the mixture was adjusted so that the solids content was 20%. 0.8 part of 2,4-dihydroxybenzophenone was next added thereto as an ultraviolet light absorber. After the mixture was stirred to make it uniform, it was filtered. 0.05 part of tetramethylammonium formate was further added thereto and stirred to make the mixture uniform, thereby obtaining a second component (2).

First compositions comprising each component having a composition shown in Table 1 were coated on Lumilar T (trade name: produced by Toray Industries, Inc.; polyethylene terephthalate film, thickness: 50 micro meter) by a bar coating method with a Meyer bar #9, then heated at 120° C. for 5 minutes and dried. The film thickness was 1 micro meter.

After drying, such coated substrates were cooled to room temperature, and the second composition (1) or (2) was then applied in the same way as is the case with the first composition, heated at 120° C. for 3 minutes, dried and thereafter cooled to room temperature, thereby obtaining polyethylene terephthalate films having a protective film. The protective film thickness was 6 micro meter.

For such coated polyethylene terephthalate films, the bonding strength, thermal shock resistance, boiling water resistance, wear resistance and weathering properties were examined in the following way. The results are shown in Table 2.

Bonding strength:
  100 crosscuts 1 mm wide were formed on the protective film. A cellophane adhesive tape was pasted on the crosscut surface and was pulled strongly in the orthogonal direction to the film to observe the peeled state of the film. The bonding strength in the tests on the thermal shock resistance and boiling water resistance was also examined in this way.

Thermal shock resistance:
  Test pieces were exposed to temperature conditions of −30° C. to 80° C. for 3 hours, respectively, by using a thermal shock resistance testing machine produced by Tabai Seisakusho Ltd. After this cycle was repeated 5 times, the external appearance and the bonding strength of the film were observed.

Boiling water resistance:
  After test pieces were immersed in boiling water for 30 minutes, the bonding strength was observed.

Wear resistance:
  Surface of test pieces were scratched under the condition that the truck wheel was CS-10 and the load was 500 g by using a Taber abrasion tester produced by Toyo Seiki Ltd. 100 cycles of tests were carried out and the degree of the scratch was evaluated by Haze value (ΔH %), which was obtained by analyzing the scratch by Direct-Read Haze computer (trade name: produced by Suga Testing Machine Mfg. Co. Ltd.).

Weathering properties:

After test pieces were exposed to light for 500 hours by using a Sunshine Weatherometer, the external appearance and the bonding strength was observed.

TABLE 1

|  | First Composition Component | | | Second Composition |
|---|---|---|---|---|
|  | (A) | (B) | (C) |  |
| Example |  |  |  |  |
| 1 | 5 | 20 | 0.7 | (1) |
| 2 | 5 | 20 | 1.4 | (1) |
| 3 | 5 | 25 | 0.9 | (1) |
| 4 | 5 | 25 | 1.8 | (1) |
| 5 | 5 | 20 | 0.7 | (2) |
| 6 | 5 | 20 | 1.4 | (2) |
| 7 | 5 | 25 | 0.9 | (2) |
| 8 | 5 | 25 | 1.8 | (2) |
| Comparative Example |  |  |  |  |
| 1 | 50 | 0 | 7 | (1) |
| 2 | 0 | 25 | 0 | (1) |
| 3 | 50 | 0 | 7 | (2) |
| 4 | 0 | 25 | 0 | (2) |

TABLE 2

| Evaluation | Bonding Strength | Thermal Shock Resistance | Boiling Water Resistance | Wear Resistance | Weathering Properties |
|---|---|---|---|---|---|
| Example |  |  |  |  |  |
| 1 | Good | No abnormality | No abnormality | 1.5 | Good |
| 2 | " | " | " | 2.0 | " |
| 3 | " | " | " | 1.7 | " |
| 4 | " | " | " | 1.0 | " |
| 5 | " | " | " | 1.7 | " |
| 6 | " | " | " | 2.2 | " |
| 7 | " | " | " | 1.9 | " |
| 8 | " | " | " | 1.2 | " |
| Comparative Example |  |  |  |  |  |
| 1 | The first film is opaqued when the second film was coated. | | | | |
| 2 | Bad | — | — | — | — |
| 3 | The first film is opaqued when the second film was coated. | | | | |
| 4 | Bad | — | — | — | — |

We claim:

1. A protection method for molded-plastic surfaces comprising the steps of:
    applying on said surface of molded-plastics a first film from a composition including
    (A) acrylic polyol obtained by copolymerization of at least one acrylic monomer containing a hydroxyl group, 5 to 80 parts by weight,
    (B) polyalkyl methacrylate, 95 to 20 parts by weight, and
    (C) isocyanate compound containing at least two isocyanate groups in a molecule, as an isocyanate group 0.5 to 20 equivalents with respect to 1 equivalent of a hydroxyl group in (A);
    heating and drying said first film; applying on said first film a second film from a composition including
    (D) organosilanetriol, represented by $R^1Si(OH)_3$ wherein $R^1$ represents a monovalent hydrocarbon group selected from the group consisting of an alkyl group having 1 to 3 carbon atoms and an aryl group, or a partial condensate thereof, 10 to 90 parts by weight and
    (E) colloidal silica, 90 to 10 parts by weight; and heating and drying said second film.

2. A protection method for molded-plastic surfaces according to claim 1, wherein said molded-plastics is made of polyethylene terephthalate.

3. A two part coating composition for application to molded-plastic surfaces comprising:
    (I) a first package of primer composition comprising:
        (A) acrylic polyol obtained by copolymerization of at least an acrylic monomer containing a hydroxyl group, 50 to 80 parts by weight,
        (B) polyalkyl methacrylate, 95 to 20 parts by weight, and
        (C) isocyanate compound containing at least two isocyanate groups in a molecule, as an isocyanate group 0.5 to 20 equivalents with respect to 1 equivalent of a hydroxyl group in (A); and
    (II) a second package of top coat composition comprising:
        (D) organosilanetriol, represented by $R^1Si(OH)_3$ wherein $R^1$ represents a monovalent hydrocarbon group, or a partial condensate thereof, 10 to 90 parts by weight, and
        (E) colloidal silica, 90 to 10 parts by weight.

* * * * *